United States Patent [19]

Garcia-Mallol

[11] Patent Number: 4,773,339
[45] Date of Patent: Sep. 27, 1988

[54] PROCESS FOR REMOVING NITROUS OXIDES FROM A GAS

[75] Inventor: Juan A. Garcia-Mallol, Morristown, N.J.

[73] Assignee: Foster Wheeler Energy Corporation, Clinton, N.J.

[21] Appl. No.: 49,900

[22] Filed: May 15, 1987

[51] Int. Cl.⁴ .................... F23J 11/00; F23J 15/00
[52] U.S. Cl. .................... 110/345; 110/245; 122/4 D; 422/182
[58] Field of Search .......... 110/345, 347, 245; 431/5; 422/38, 139, 182; 165/104.16; 423/239; 122/4 D

[56] References Cited

U.S. PATENT DOCUMENTS 4,236,464 12/1980 Anderson et al. ............. 431/5 X
4,454,826 6/1984 Benedick ....................... 422/182 X
4,543,894 10/1985 Griswold et al. ............. 110/345 X
4,579,070 4/1986 Lin et al. ..................... 122/4 D X
4,650,414 3/1987 Grenfell ....................... 431/5

Primary Examiner—Edward G. Favors
Attorney, Agent, or Firm—Marvin A. Naigur; Warren Kice

[57] ABSTRACT

A process for removing nitrous oxides from a gas, comprising the step of passing air through a bed of particulate material including a carbonaceous material to fluidize the material and promote combustion of the fuel and adding additional carbonaceous material to the bed. Additional air above the area of introduction of the air passes through the bed and passes the gas through the bed so that carbonaceous material scavenges the oxygen in the nitrous oxides.

11 Claims, 1 Drawing Sheet

U.S. Patent  Sep. 27, 1988  4,773,339
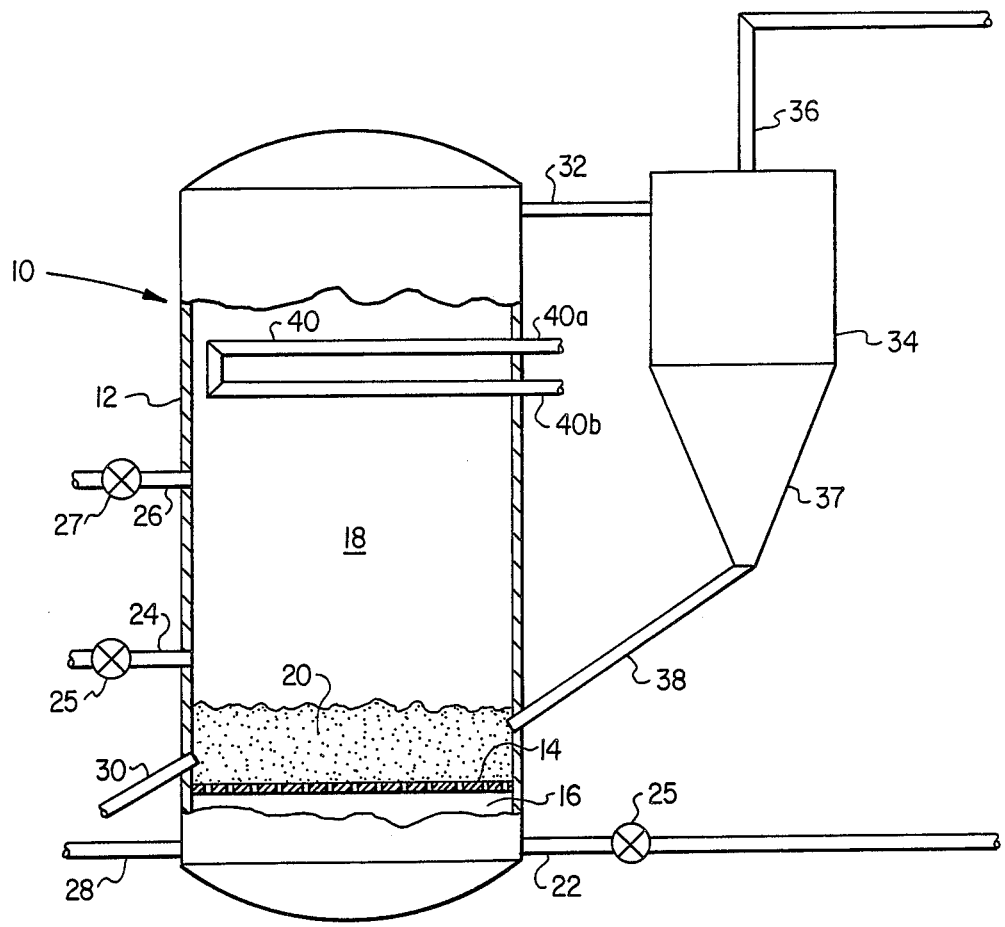

PROCESS FOR REMOVING NITROUS OXIDES FROM A GAS

BACKGROUND OF THE INVENTION

This invention relates to a process for removing nitrous oxides from a gas, and more particularly, to such a method in which the gas is passed through a fluidized bed reactor operating in a manner to remove the nitrous oxides from the gas.

Combustion systems utilizing fluidized beds as the primary source of heat generation are well known. In these arrangements, air is passed through a bed of particulate material, including a fossil fuel such as coal and an adsorbent for the sulphur generated by the combustion of the coal, to fluidize the bed and promote the combustion of the fuel at relatively low temperatures. An added advantage is that the fluidized bed combustion process has the ability to produce lower emissions of nitrous oxides (NOx) than conventional combustion systems.

In U.S. Pat. No. 4,308,810, assigned to the assignee of the present invention, an apparatus and method is disclosed in which the reduction of NOx emissions from a fluidized combustion system is reduced even further from the reduction achieved by the standard fluidized bed. In this technique, the amount of air added to the bed is less than the required for complete combustion resulting in the production of extremely low NOx. To reduce carbon monoxide and methane to acceptable levels, overfire air is added above the upper surface of the fluidized bed which results in a large reduction of the carbon monoxide with little or no increase in the already low NOx emissions. The bed material includes an adsorbent for the sulfur generated by the combustion of the fuel, and the above technique does not compromise the sulphur capture performance.

However, these prior art techniques have been limited to the reduction of NOx from the self-generated gases in the bed, and have not been applied to the reduction of nitrous oxide from external gases such as the gases received from an oil refinery or the like, which are laden with NOx and with sulphur.

SUMMARY OF THE INVENTION

It is therefore an object of the present invention to provide a process for removing nitrous oxides from a gas from an external source which is passed through a fluidized bed operating under certain conditions.

It is a still further object of the present invention to provide a process of the above type in which the gas to be treated is passed, with the fluidizing air, through a bed of carbonaceous material to fluidize the bed while additional air is added above the area of introduction of the air passing through the bed, to remove the nitrous oxides from the gas.

It is a still further object of the present invention to provide a process of the above type in which the carbonaceous material scavenges the oxygen in the nitrous oxides.

It is a still further object of the present invention to provide a process of the above type in which the amount of air passed through the bed is less than that required for complete combustion of the carbonaceous material and wherein the amount of additional air added is sufficient to complete the combustion.

Toward the fulfillment of these and other objects according to the process of the present invention air is passed through a bed of particulate material including a carbonaceous material to fluidize the material and promote combustion of the fuel. Additional carbonaceous material is added to the bed along with additional air above the area of introduction of the air passing through the bed. The gas to be treated is passed through the bed so that the carbonaceous material scavenges the oxygen in the nitrous oxides.

BRIEF DESCRIPTION OF THE DRAWINGS

The above brief description, as well as further objects, features and advantages of the present invention will be more fully appreciated by reference to the following detailed description of the presently preferred but nonetheless illustrative embodiment in accordance with the present invention when taken in conjunction with the accompanying drawing which is a schematic view depicting a fluidized bed reactor which is utilized in the process of the present invention.

DESCRIPTION OF THE PREFERRED EMBODIMENTS

Referring specifically to the drawings, the reference numeral 10 refers in general to a fluidized bed reactor which includes a vessel 12 having a perforated plate, or grate 14, extending across the lower portion thereof to define an air inlet chamber 16 and a combustion chamber 18.

A bed of particulate material, shown in general by the reference numeral 20, is supported on the plate 14 and includes a particulate carbonaceous fuel material, such as coal and a particulate adsorbent, such as limestone, for adsorbing the sulphur generated by the combustion of the coal.

A primary air inlet pipe 22 extends through the rear wall of the vessel 12 in communication with the air chamber 16, and a particulate carbonaceous fuel inlet pipe 24 extends through the front wall of the vessel 12 in communication with the chamber 18 at an area just above the upper level of the bed 20. It is understood that the pipes 22 and 24 are connected to sources (not shown) of pressurized air and particulate fuel, respectively, for introducing the air and fuel into the air chamber 16 and the combustion chamber 18, respectively. An air flow control device 25, which may be in the form of a damper, or valve, is disposed in the air and fuel inlet pipes 22 and 24, respectively, for controlling the flow of air and fuel into the vessel 12 for reasons to be described. The particulate adsorbent material may be introduced onto the bed from an inlet pipe (not shown) extending into the chamber 18 in the same manner as the fuel inlet pipe 24.

A secondary air inlet pipe 26 extends through the front wall of the vessel 12 above the location of the fuel inlet pipe 24, as viewed in the drawing, and in communication with the chamber 18. The pipe 26 is connected to a source of pressurized air (not shown) and functions to introduce this air into the chamber 28 above the bed 20 and above the area of introduction of the fuel from the fuel inlet pipe 24, for reasons to be explained. Air flow control device 27, which may in the form of a damper, or valve, is disposed in the air inlet pipe 26 and functions in the same manner as the valve 25.

An inlet pipe 28 is provided through the front wall of the vessel 12 in communication with the air chamber 16 and is connected to a source (not shown) of process gas from an external source, such as an oil refinery, or the like, and functions to introduce this gas into the chamber 16 for treatment, as will be described.

A solids discharge pipe 30 extends from the bed 20, through the front wall of the vessel 12, and to an area externally of the vessel for discharging spent and unspent particulate material from the bed, for reasons that will be described.

An outlet pipe 32 extends through the rear wall of the vessel 12 in communication with the upper portion of the chamber 18 for receiving a mixture of flue gases and the gases to be treated, including entrained solid particulate material, from the bed 20 and for passing same to a cyclone separator 34. The separator 34 functions in a conventional manner to separate the gases from the entrained solid particulate material by centrifugal forces, with the former being discharged, via an outlet pipe 36 to external equipment (not shown) such as heat recovery unit, and the latter falling into a hopper 37 disposed on the lower portion of the separator. A pipe 38 is connected to an outlet formed in the lower portion of the hopper 37 and extends through the rear wall of the vessel 12 and into the bed 20. The pipe 38 thus functions to reinject the particulate material from the cyclone separator 34 back into the bed 20, for reasons that will be described.

It is understood that a plurality of water tubes, one of which is shown by the reference numeral 40 can be disposed in the combustion chamber 18 above the bed 20. The respective end portions 40a and 40b of the tubes 40 extend through the rear wall of the vessel 12 and are connected to a water circuit (not shown) for passing water through the tubes to control the temperature inside the vessel 12.

In operation, pressurized air from an external source along with the gases to be treated from another process or source are passed, via the inlets 22 and 28, respectively, into the chamber 16, from which they pass through the perforated plate 14 and into the bed 20 of particulate carbonaceous fuel material and adsorbent. The velocity of the air is sufficient to fluidize the bed 20 and promote the combustion of the particulate fuel and adsorbent material. The gases not combusting in the bed combine with the gaseous products of combustion and with the air introduced via the conduit 26 to form a flue gas that passes through the length of the vessel 12 before exiting from the outlet pipe 32. During this passage, the flue gas entrains the relatively fine particulate material in the bed and the resulting mixture is passed into the separator 34.

The volume of air introduced into the chamber 16 is carefully controlled so that is insufficient to completely combust the fuel in the bed 20 but sufficient to generate a combustible off-gas which combines with the gases from the inlet 28. Additional air is introduced, via the pipe 26 into the vessel 12 above the bed 20 in sufficient quantities to complete the combustion. The combustibles in said gas are incinerated by the heat from the bed 20 and the sulfur in the gases are captured by the adsorbent particulate material in the bed 20. Also, the nitrous oxides are removed from the gases due to the presence of the carbonaceous material in the bed and the addition of the additional air, via the pipe 26, above the bed. The gases in the separator 34 are separated from their entrained particulate material and the latter is reinjected, via the conduit 38, back into the bed 20. The relatively clean gases from the separator 34 pass, via the conduit 36, to external equipment for further treatment and/or use.

It is understood that the fluidized bed boiler 10 can be of a "bubbling" type or a "circulating" type. In the bubbling type, the air passing through the plate 14 causes the material in the bed 20 to expand and take on a suspended, or fluidized, state. The gas velocity is typically two to three times that needed to develop a pressure drop which will support the bed weight (e.g., minimum fluidization velocity), causing the formation of bubbles that rise up through the bed and give it the appearance of a boiling liquid. The bed 20 exhibits a well-defined upper surface as shown in FIG. 1, and the density is typically 30% volume of solids.

In a circulating bed the mean gas velocity, as a fraction of the minimum fluidizing velocity, is increased above that for the bubbling bed, so that the bed surface becomes more diffused and the solids entrainment from the bed is increased requiring a relatively high solids recycle. According to this process, the density of the circulating bed is relatively low, such as between 5 and 20% volume of solids due to the small particle size and the high solids throughput. The velocity range of a circulating bed is between the solids terminal, or free fall, velocity and a velocity beyond which the bed would be converted into a pneumatic transport line. Also, the high solids circulation required by the circulating bed makes it insensitive to fuel heat release patterns, thus minimizing the variation of the temperature within the vessel, and therefore further decreasing the nitrogen oxides formation. Also, the high solids loading improves the efficiency of the separator used to separate the gas from the solids for solids recycle. The resulting increase in sulphur adsorbent and fuel residence times reduces the adsorbent and fuel consumption.

Other modifications, changes and substitutions are intended in the foregoing disclosure and, in some instances, some features of the invention can be employed without a corresponding use of other features. Accordingly, it is appropriate that the appended claims be construed broadly and in a manner consistent with the scope of the invention therein.

What is claimed is:

1. A process for removing nitrous oxides from a gas, comprising the step of passing air through a bed of particulate material including a carbonaceous material to fluidize the material and promote combustion of said carbonaceous material, adding additional carbonaceous material to said bed, adding additional air above the area of introduction of said air passing through said bed, and passing said gas through said bed so that said carbonaceous material scavenges the oxygen in the nitrous oxides in said gas.

2. The process of claim 1 wherein the amount of air passed through said bed is less than that required for complete combustion of said carbonaceous material and wherein the amount of said additional air that is added is sufficient to complete said combustion.

3. The process of claim 1 further comprising the steps of controlling the amount of air passed through the bed and controlling the amount of additional air added to said bed.

4. The process of claim 1 wherein said air is passed from the lower portion of said bed and upwardly through said bed.

5. The process of claim 4 wherein said additional air is added to an area above said bed.

6. The process of claim 1 further comprising the step of discharging a portion of said particulate material from said bed in quantities to eliminate build up of said particulate material in said bed.

7. The process of claim 1 further comprising the steps of discharging flue gases containing entrained particulate material from said bed, separating said entrained particulate material from said bed and reinjecting said separated particulate material back into said bed.

8. The process of claim 1 wherein said particulate material includes an adsorbent for the sulphur in said gas and the sulphur generated by the combustion of said carbonaceous material.

9. The process of claim 1 wherein the combustibles in said gas are incinerated by the heat from said fluidized bed.

10. The process of claim 1 wherein the quantities of said material and said air passed through and added to said bed are regulated so that said bed operates as a circulating bed.

11. The process of claim 1 further comprising the step of passing a cooling fluid in a heat exchange relation to said bed to control the temperature of said bed.

* * * * *